United States
Tojo

4,176,912
Dec. 4, 1979

[54] MICROSCOPE OBJECTIVE LENS SYSTEM
[75] Inventor: Tsutomu Tojo, Hachiouji, Japan
[73] Assignee: Olympus Optical Company Limited, Tokyo, Japan
[21] Appl. No.: 889,922
[22] Filed: Mar. 24, 1978
[30] Foreign Application Priority Data
Apr. 1, 1977 [JP] Japan .................. 52-36197
[51] Int. Cl.$^2$ ............................... G02B 9/60
[52] U.S. Cl. ..................... 350/175 ML; 350/219
[58] Field of Search ........... 350/175 ML, 176, 219
[56] References Cited
U.S. PATENT DOCUMENTS
3,537,773  11/1970  Klein .................... 350/219 X
3,575,495   4/1971  Tibbetts et al. ........... 350/219

*Primary Examiner*—Paul A. Sacher
*Attorney, Agent, or Firm*—Cushman, Darby & Cushman

[57] ABSTRACT

A microscope objective lens system which comprises a first lens component of a positive lens, a second lens component of a positive meniscus lens having its convex surface faced to the object side, a third lens component of a negative lens, a fourth lens component of a positive meniscus lens having its concave surface faced to the object side, and fifth lens component of a double-convex lens, in which image plane through the objective lens system can coincide with a reverse-traced image plane through an eyepiece lens system and which enables observation with a flat image plane through the eyepiece lens system.

7 Claims, 7 Drawing Figures

MICROSCOPE OBJECTIVE LENS SYSTEM

BACKGROUND OF THE INVENTION (a) Field of the Invention

The present invention relates to a microscope objective lens system of low magnification.

(b) Description of the Prior Art

In a conventional microscope objective lens system of low magnification, in order to improve the flatness of an image plane, there were problems in that it was necessary to increase the number of lens components and also the working distance had to become short. Further, for conventional microscope objective lens systems, it was not possible to obtain a satisfactory resolving power. It appears that a cause of this problem in resolving power resides especially in the fact that an increased amount of a spherical aberration at an intermediate angle of view is large.

The United States Patent Application Ser. No. 829,574 filed on Aug. 31, 1977 in the name of the same invention as in the present application discloses a microscope objective lens system of low magnification which overcomes such drawbacks as described above and in which the number of lens components is comparatively small and a working distance is large and yet the flatness of the image plane is improved and the increased amount of spherical aberration at an intermediate angle of view is corrected so that the resolving power is improved to a large extent.

SUMMARY OF THE INVENTION

It is therefore an object of the present invention to provide an improved objective lens system in which an image plane through the objective lens system can coincide with a reverse-traced image plane through an eyepiece lens system and which enables observation with a flat image plane through the eyepiece lens system.

The objective lens system according to the present invention is described in detail hereinafter and its lens composition is shown in FIG. 1, in which the lens system comprises five components of lenses consisting of from the object side, a first lens component of a positive lens, a second lens component of a positive meniscus lens having its convex surface faced to the object side, a third lens component of a negative lens, a fourth lens component of a positive meniscus lens having its concave surface faced to the object side, and a fifth lens component of a double-convex lens. This lens system satisfies each of the conditions enumerated below:

(1) $0.14f < d_3 < 0.5f$ (2) $0.28f < |r_2| < 0.69f$
$0.28f < |r_8| < 0.69f$ (3) $0.5 < |r_4/r_3| < 2.7$ (4) $2.5d_4 < d_5/n_3 + d_6 + d_7/n_4 < 7d_4$ (5) $\nu_3 < 35$, $\nu_1 > 50$, $n_1 > 1.60$ wherein the reference symbols f represent a focal length of the entire lens system, the reference symbols $r_1, r_2 \ldots$ represent radii of curvature of the respective lenses starting in sequence from the object side, the reference symbols $d_1, d_2 \ldots$ represent thicknesses and airspaces of the respective lenses, the reference symbols $n_1, n_2 \ldots$ represent refractive indices of the respective lenses and $\nu_1, \nu_2 \ldots$ represent Abbe's numbers of the respective lenses.

As to the above conditions, the condition (1) is for determining the thickness of the second lens component. Under this condition, when the thickness $d_3$ is below 0.14f, the coma aberration is markedly aggravated and, when the same is above 0.5f, the balance of the spherical aberration is aggravated.

Further, under condition (2), when radii of curvature $|r_2|$ of the surface of the first lens component at the image side is below 0.28f, the spherical aberration is overcorrected, and when the same is above 0.69f, the astigmatic difference is increased. Also, when the radii of curvature $|r_8|$ of the surface of the fourth lens component at the image side is below 0.28f, the spherical aberration and coma aberration are aggravated, and when the same is above 0.69f, the coma aberration is aggravated.

The condition (3) relates to the correction of lateral chromatic aberration. In a microscope objective lens system of high magnification in general, because it is not easy for the system to obtain a well-corrected lateral chromatic aberration, a certain amount of lateral chromatic aberration remains and this is corrected by an eyepiece lens system. In the same manner, a microscope objective lens system of low magnification is also so designed that a certain amount of lateral chromatic aberration remains and that such a lens system and such an eyepiece lens system together can satisfactorily correct the lateral chromatic aberration. In the objective lens system of the present invention also, it is arranged that a certain amount of lateral chromatic aberration occurs and, for this purpose, the ratio of radii of curvature of both the surfaces of the second lens component is appropriately established as given under the condition (3). Under this condition (3), when $|r_4/r_3|$ is below 0.5, the lateral chromatic aberration becomes too large, and when the same is above 2.7, the occurence of lateral chromatic aberration is too small and this is not desirable for the reasons as given above.

The condition (4) relates to the above point of improvement with respect to the objective lens system of the present invention. That is to say that in the objective lens system of the present invention, the curvature of field of the objective lens is inclined from the Gauss image surface so as to coincide with the curvature of field of the eyepiece lens. The condition (4) is established for this purpose, and below the lower limit of this condition, the inclination of the curvature of field becomes small and flatness of the image plane as a whole is lost because the curvature of field does not coincide with the curvature of field of the eyepiece lens. Above the upper limit of this condition, spherical aberration is markedly aggravated. Especially, the airspace between the third lens component and the fouth lens component has a character which affects the spherical aberration.

The condition (5) improves the Petzval's sum and spherical aberration taking into account lateral chromatic aberration, and when the condition is $\nu_3 > 35$, $\nu_1 < 50$, the spherical aberration is undercorrected. Further, when the condition is $n_1 < 1.60$, the Petzval's sum is aggravated and the flatness of image plane is affected. Furthermore, when this condition (5) is met in selecting the material to be used for the first lens component, the astigmatic aberration is effectively improved.

DESCRIPTION OF THE PREFERRED EMBODIMENTS

Figure 1:
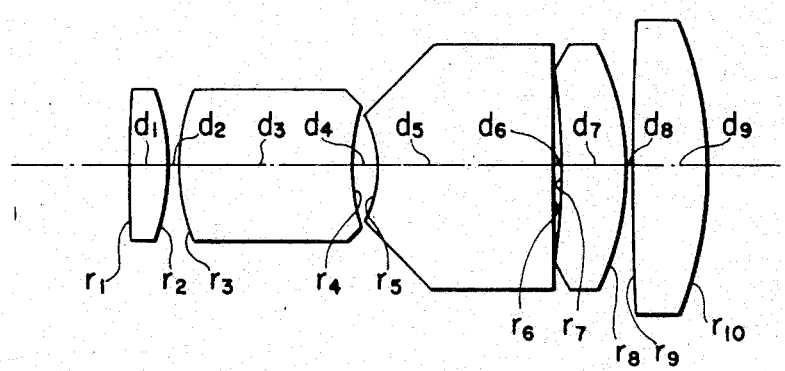
FIG. 1 shows a sectional view illustrating the composition of the microscope objective lens system according to the present invention.
Figure 2:
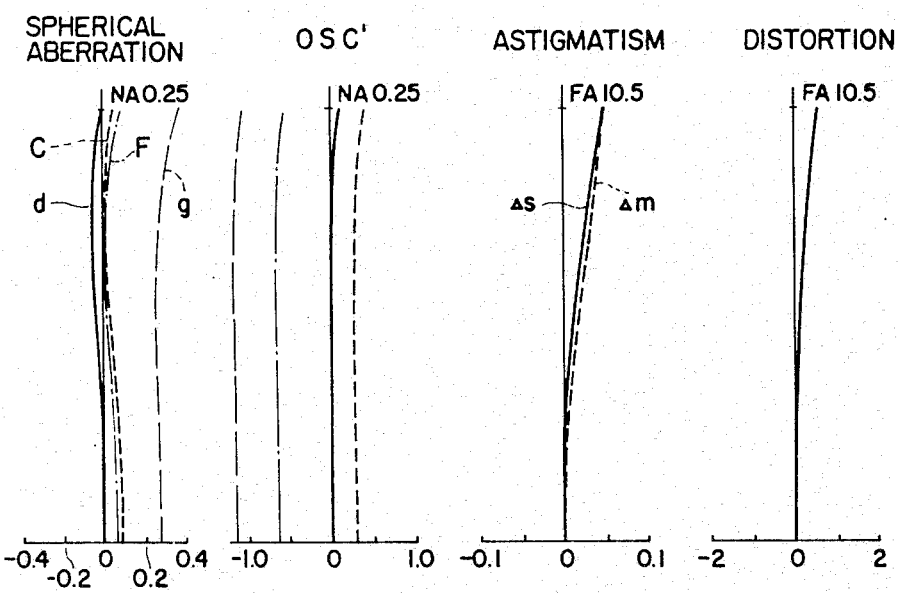
FIG. 2 illustrates curves showing the aberration characteristics of the Embodiment 1.
Figure 3:
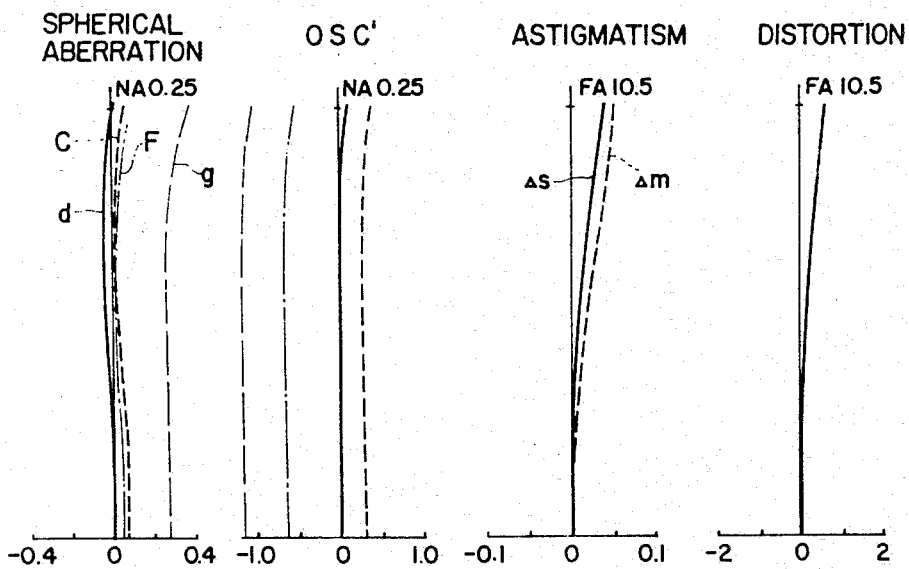
FIG. 3 illustrates curves showing the aberrations characteristics of the Embodiment 2.
Figure 4:
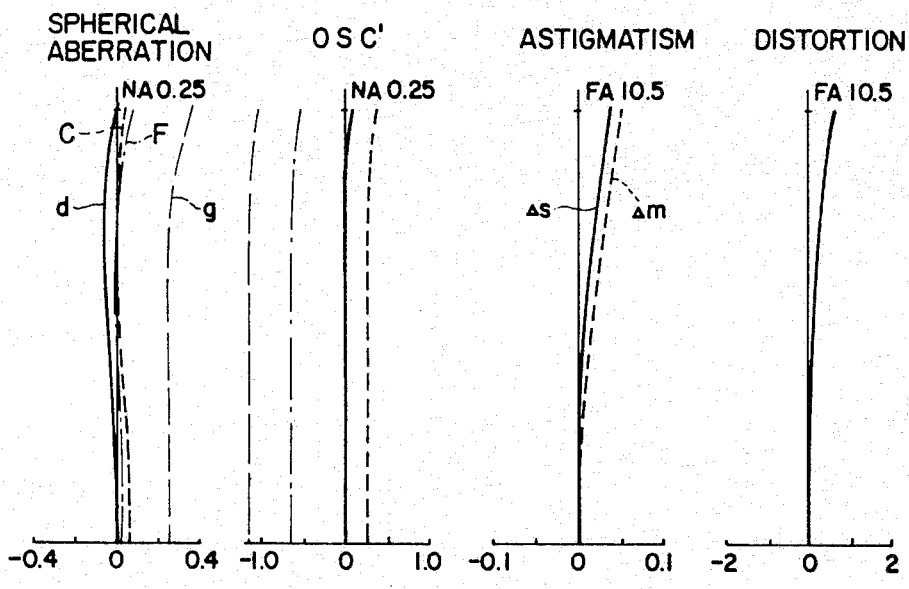
FIG. 4 illustrates curves showing the aberration characteristics of the Embodiment 3.
Figure 5:
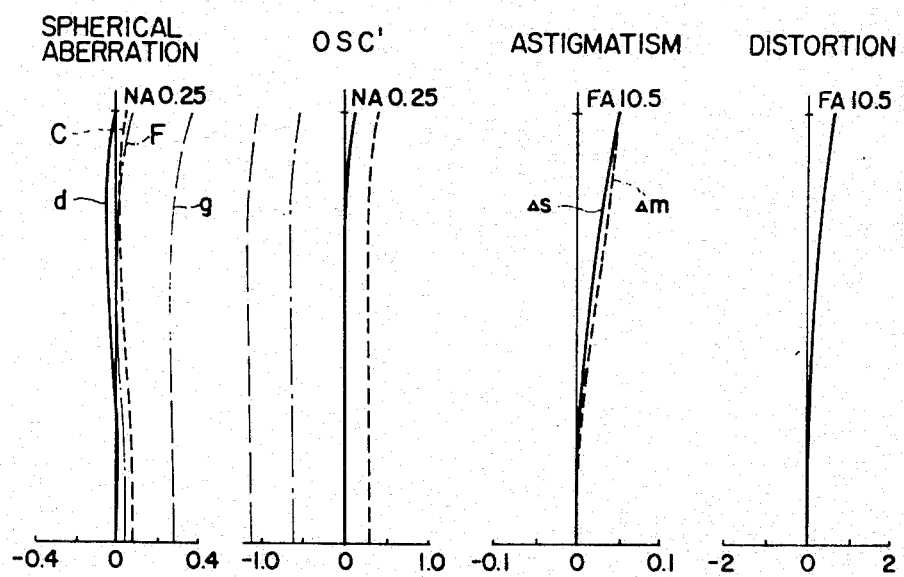
FIG. 5 illustrates curves showing the aberration characteristics of the Embodiment 4.
Figure 6:
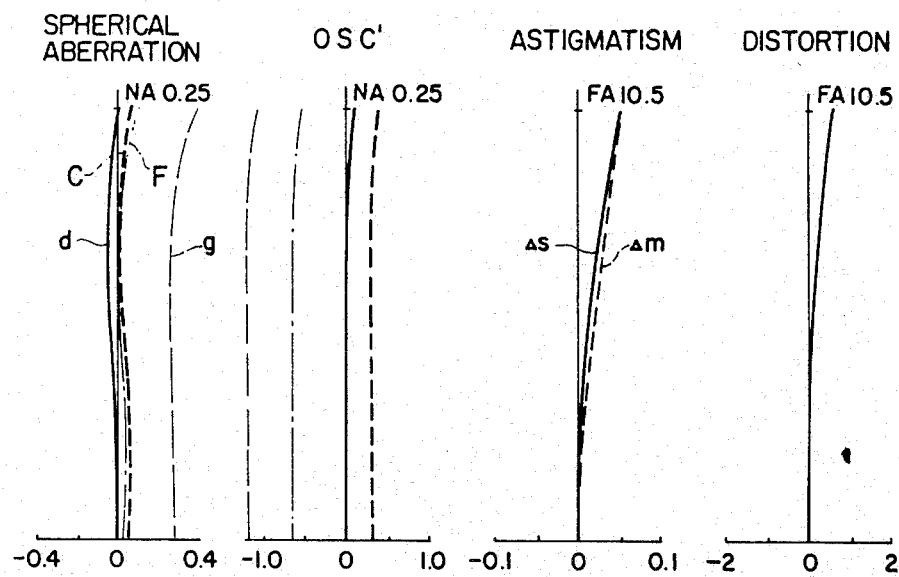
FIG. 6 illustrates curves showing the aberration characteristics of the Embodiment 5.
Figure 7:
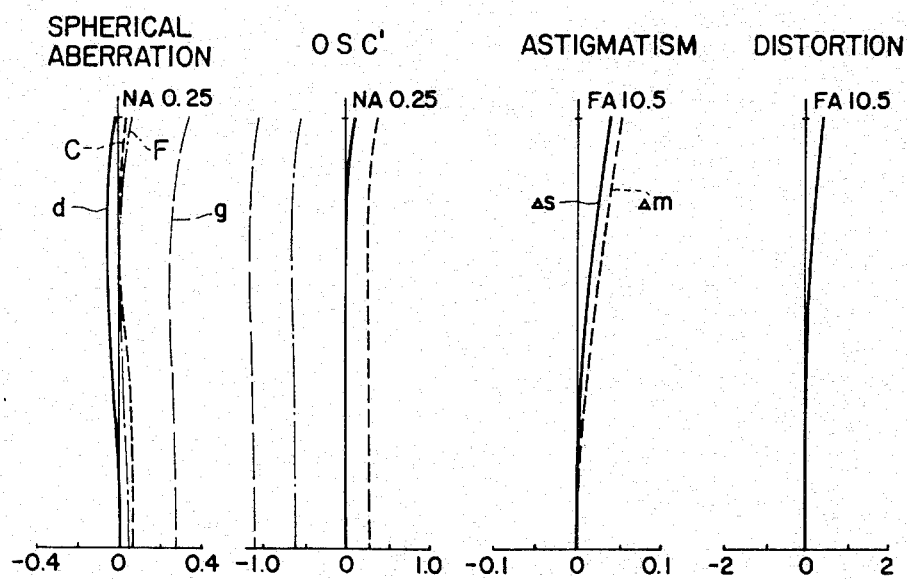
FIG. 7 illustrates curves showing the aberration characteristics of the Embodiment 6.

Now, some preferred embodiments of the present invention relating to the microscope objective lens system as described above are given below:

Embodiment 1

$f = 1.0$, N.A $= 0.25$, W.D. $= 0.4306$, $\beta = 10X$

| | | | |
|---|---|---|---|
| $r_1 = 3.3023$ | | | |
| | $d_1 = 0.0746$ | $n_1 = 1.69350$ | $\nu_1 = 53.23$ |
| $r_2 = -0.4440$ | | | |
| | $d_2 = 0.0201$ | | |
| $r_3 = 0.4692$ | | | |
| | $d_3 = 0.3327$ | $n_2 = 1.62041$ | $\nu_2 = 60.27$ |
| $r_4 = 0.3526$ | | | |
| | $d_4 = 0.0522$ | | |
| $r_5 = -0.2018$ | | | |
| | $d_5 = 0.3419$ | $n_3 = 1.80518$ | $\nu_3 = 25.43$ |
| $r_6 = \infty$ | | | |
| | $d_6 = 0.0075$ | | |
| $r_7 = -2.3636$ | | | |
| | $d_7 = 0.1268$ | $n_4 = 1.61800$ | $\nu_4 = 63.38$ |
| $r_8 = -0.5095$ | | | |
| | $d_8 = 0.0057$ | | |
| $r_9 = 4.1962$ | | | |
| | $d_9 = 0.1394$ | $n_5 = 1.65830$ | $\nu_5 = 57.33$ |
| $r_{10} = -0.7572$ | | | |

Embodiment 2

$f = 1.0$, N.A $= 0.25$, W.D $= 0.4311$, $\beta = 10X$

| | | | |
|---|---|---|---|
| $r_1 = 4.1550$ | | | |
| | $d_1 = 0.0746$ | $n_1 = 1.69350$ | $\nu_1 = 53.23$ |
| $r_2 = -0.4454$ | | | |
| | $d_2 = 0.0201$ | | |
| $r_3 = 0.4729$ | | | |
| | $d_3 = 0.3328$ | $n_2 = 1.62041$ | $\nu_2 = 60.27$ |
| $r_4 = 0.3726$ | | | |
| | $d_4 = 0.0597$ | | |
| $r_5 = -0.2109$ | | | |
| | $d_5 = 0.3420$ | $n_3 = 1.80518$ | $\nu_3 = 25.43$ |
| $r_6 = \infty$ | | | |
| | $d_6 = 0.0075$ | | |
| $r_7 = -2.2705$ | | | |
| | $d_7 = 0.1308$ | $n_4 = 1.61800$ | $\nu_4 = 63.38$ |
| $r_8 = -0.5182$ | | | |
| | $d_8 = 0.0057$ | | |
| $r_9 = 4.1826$ | | | |
| | $d_9 = 0.1394$ | $n_5 = 1.65830$ | $\nu_5 = 57.33$ |
| $r_{10} = -0.7745$ | | | |

Embodiment 3

$f = 1.0$, N.A $= 0.25$, W.D $= 0.4312$, $\beta = 10X$

| | | | |
|---|---|---|---|
| $r_1 = 4.2548$ | | | |
| | $d_1 = 0.0746$ | $n_1 = 1.69350$ | $\nu_1 = 53.23$ |
| $r_2 = -0.4437$ | | | |
| | $d_2 = 0.0144$ | | |
| $r_3 = 0.4894$ | | | |
| | $d_3 = 0.3450$ | $n_2 = 1.62041$ | $\nu_2 = 60.27$ |
| $r_4 = 0.3819$ | | | |
| | $d_4 = 0.0542$ | | |
| $r_5 = -0.2106$ | | | |
| | $d_5 = 0.3424$ | $n_3 = 1.80518$ | $\nu_3 = 25.43$ |
| $r_6 = \infty$ | | | |
| | $d_6 = 0.0075$ | | |
| $r_7 = -2.3395$ | | | |
| | $d_7 = 0.1313$ | $n_4 = 1.61800$ | $\nu_4 = 63.38$ |
| $r_8 = -0.5182$ | | | |
| | $d_8 = 0.0057$ | | |
| $r_9 = 4.2540$ | | | |
| | $d_9 = 0.1398$ | $n_5 = 1.65830$ | $\nu_5 = 57.33$ |
| $r_{10} = -0.7759$ | | | |

Embodiment 4

$f = 1.0$, N.A $= 0.25$, W.D $= 0.4282$, $\beta = 10X$

| | | | |
|---|---|---|---|
| $r_1 = 4.4042$ | | | |
| | $d_1 = 0.0742$ | $n_1 = 1.72916$ | $\nu_1 = 54.68$ |
| $r_2 = -0.4510$ | | | |
| | $d_2 = 0.0200$ | | |
| $r_3 = 0.4462$ | | | |
| | $d_3 = 0.3138$ | $n_2 = 1.62041$ | $\nu_2 = 60.27$ |
| $r_4 = 0.3419$ | | | |
| | $d_4 = 0.0690$ | | |
| $r_5 = -0.2035$ | | | |
| | $d_5 = 0.3401$ | $n_3 = 1.80518$ | $\nu_3 = 25.43$ |
| $r_6 = \infty$ | | | |
| | $d_6 = 0.0074$ | | |
| $r_7 = -2.2995$ | | | |
| | $d_7 = 0.1314$ | $n_4 = 1.61800$ | $\nu_4 = 63.38$ |
| $r_8 = -0.5150$ | | | |
| | $d_8 = 0.0057$ | | |
| $r_9 = 4.6177$ | | | |
| | $d_9 = 0.1386$ | $n_5 = 1.65830$ | $\nu_5 = 57.33$ |
| $r_{10} = -9.7498$ | | | |

Embodiment 5

$f = 1.0$, N.A $= 0.25$, W.D $= 0.4277$, $\beta = 10X$

| | | | |
|---|---|---|---|
| $r_1 = 4.2976$ | | | |
| | $d_1 = 0.0741$ | $n_1 = 1.69680$ | $\nu_1 = 55.52$ |
| $r_2 = -0.4373$ | | | |
| | $d_2 = 0.0199$ | | |
| $r_3 = 0.4327$ | | | |
| | $d_3 = 0.3135$ | $n_2 = 1.62041$ | $\nu_2 = 60.27$ |
| $r_4 = 0.3415$ | | | |
| | $d_4 = 0.0690$ | | |
| $r_5 = -0.2015$ | | | |
| | $d_5 = 0.3397$ | $n_3 = 1.80518$ | $\nu_3 = 25.43$ |
| $r_6 = \infty$ | | | |
| | $d_6 = 0.0074$ | | |
| $r_7 = -2.0378$ | | | |
| | $d_7 = 0.1313$ | $n_4 = 1.61800$ | $\nu_4 = 63.38$ |
| $r_8 = -0.5122$ | | | |
| | $d_8 = 0.0057$ | | |
| $r_9 = 4.2025$ | | | |
| | $d_9 = 0.1385$ | $n_5 = 1.65830$ | $\nu_5 = 57.33$ |
| $r_{10} = -0.7450$ | | | |

Embodiment 6

$f = 1.0$, N.A $= 0.25$, W.D $= 0.4275$, $\beta = 10X$

| | | | |
|---|---|---|---|
| $r_1 = 1.7376$ | | | |
| | $d_1 = 0.0743$ | $n_1 = 1.72916$ | $\nu_1 = 54.68$ |
| $r_2 = -0.5075$ | | | |
| | $d_2 = 0.0194$ | | |

-continued

Embodiment 6

| | | | | |
|---|---|---|---|---|
| $r_3$ | = 0.4857 | | | |
| | $d_3$ = 0.3143 | $n_2$ = 1.62041 | $v_2$ = 60.27 | |
| $r_4$ | = 0.3659 | | | |
| | $d_4$ = 0.0692 | | | |
| $r_5$ | = −0.2100 | | | |
| | $d_5$ = 0.3177 | $n_3$ = 1.80518 | $v_3$ = 25.43 | |
| $r_6$ | = ∞ | | | |
| | $d_6$ = 0.0080 | | | |
| $r_7$ | = −2.1046 | | | |
| | $d_7$ = 0.1686 | $n_4$ = 1.61800 | $v_4$ = 63.38 | |
| $r_8$ | = −0.5049 | | | |
| | $d_8$ = 0.0057 | | | |
| $r_9$ | = 2.8964 | | | |
| | $d_9$ = 0.1200 | $n_5$ = 1.6400 | $v_5$ = 60.09 | |
| $r_{10}$ | = −0.8754 | | | | wherein the reference symbol f represents a focal length, the reference symbol β represents a lateral magnification, the reference symbol N.A. represents a numerical aperture, the reference symbol W.D. represents a working distance, the reference symbols $r_1, r_2, r_3 \ldots$ represent radii of curvature of the respective surfaces of the lenses, the reference symbols $d_1, d_2, d_3 \ldots$ represent thicknesses of the respective lenses and airspaces therebetween, the reference symbols $n_1, n_2 \ldots$ represent refractive indices of the respective lenses and the reference symbols $v_1, v_2 \ldots$ represent Abbe's numbers of the respective lenses.

I claim:

1. A microscope objective lens system comprising a first lens component of a positive lens, a second lens component of a positive meniscus lens having its convex surface faced to the object side, a third lens component of a negative lens, a fourth lens component of a positive meniscus lens having its concave surface faced to the object side, and a fifth lens component of a double-convex lens, and said lens system satisfying the following conditions:

$$0.31f < d_3 < 0.35f \quad (1)$$
$$0.43f < |r_2| < 0.51f \quad (2)$$
$$0.50f < |r_8| < 0.52f$$
$$0.75 < |r_4/r_3| < 0.79 \quad (3)$$
$$4.0d_4 < d_5/n_3 + d_6 + d_7/n_4 < 5.4d_4 \quad (4)$$
$$v_3 = 25.43 \quad (5)$$
$$56 > v_1 > 53$$
$$1.73 > n_1 > 1.69$$

wherein the reference symbols $r_2, r_3, r_4$ and $r_8$ represent radii of curvature of the surface on the image side of the first lens component, both the surfaces of the second lens component and the surface on the image side of the fourth lens component, respectively $d_3, d_5$ and $d_7$ represent thicknesses of the second lens component, the third lens component and the fourth lens component, respectively, $d_4$ and $d_6$ represent airspaces between the second lens component and the third lens component and between the third lens component and the fourth lens component, respectively, $n_1, n_3$ and $n_4$ represent refractive indices of the first lens component, the third lens component and the fourth lens component, respectively, and $v_1$ and $v_3$ represent Abbe's numbers of the first lens component and the third lens component, respectively.

2. A microscope objective lens system according to claim 1 having the following numerical data:

| | | | |
|---|---|---|---|
| f | = 1.0, N.A = 0.25, | W.D = 0.4306, | β = 10X |

-continued

| | | | | |
|---|---|---|---|---|
| $r_1$ | = 3.3023 | | | |
| | $d_1$ = 0.0746 | $n_1$ = 1.69350 | $v_1$ = 53.23 | |
| $r_2$ | = −0.4440 | | | |
| | $d_2$ = 0.0201 | | | |
| $r_3$ | = 0.4692 | | | |
| | $d_3$ = 0.3327 | $n_2$ = 1.62041 | $v_2$ = 60.27 | |
| $r_4$ | = 0.3526 | | | |
| | $d_4$ = 0.0522 | | | |
| $r_5$ | = −0.2018 | | | |
| | $d_5$ = 0.3419 | $n_3$ = 1.80518 | $v_3$ = 25.43 | |
| $r_6$ | = ∞ | | | |
| | $d_6$ = 0.0075 | | | |
| $r_7$ | = −2.3636 | | | |
| | $d_7$ = 0.1268 | $n_4$ = 1.61800 | $v_4$ = 63.38 | |
| $r_8$ | = −0.5095 | | | |
| | $d_8$ = 0.0057 | | | |
| $r_9$ | = 4.1962 | | | |
| | $d_9$ = 0.1394 | $n_5$ = 1.65830 | $v_5$ = 57.33 | |
| $r_{10}$ | = −0.7572 | | | | wherein the reference f represents a focal length of the entire lens system, N.A. represents a numerical aperture, W.D. represents a working distance, β represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $v_1$ through $v_5$ represent Abbe's numbers of the respective lenses.

3. A microscope objective lens system according to claim 1 having the following numerical data:

| | | | |
|---|---|---|---|
| f | = 1.0, N.A = 0.25, | W.D = 0.4311, | β = 10X |
| $r_1$ | = 4.1550 | | |
| | $d_1$ = 0.0746 | $n_1$ = 1.69350 | $v_1$ = 53.23 |
| $r_2$ | = −0.4454 | | |
| | $d_2$ = 0.0201 | | |
| $r_3$ | = 0.4729 | | |
| | $d_3$ = 0.3328 | $n_2$ = 1.62041 | $v_2$ = 60.27 |
| $r_4$ | = 0.3726 | | |
| | $d_4$ = 0.0597 | | |
| $r_5$ | = −0.2109 | | |
| | $d_5$ = 0.3420 | $n_3$ = 1.80518 | $v_3$ = 25.43 |
| $r_6$ | = ∞ | | |
| | $d_6$ = 0.0075 | | |
| $r_7$ | = −2.2705 | | |
| | $d_7$ = 0.1308 | $n_4$ = 1.61800 | $v_4$ = 63.38 |
| $r_8$ | = −0.5182 | | |
| | $d_8$ = 0.0057 | | |
| $r_9$ | = 4.1826 | | |
| | $d_9$ = 0.1394 | $n_5$ = 1.65830 | $v_5$ = 57.33 |
| $r_{10}$ | = −0.7745 | | | wherein the reference f represents a focal length of the entire lens system, N.A. represents a numerical aperture, W.D. represents a working distance, β represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $v_1$ through $v_5$ represent Abbe's numbers of the respective lenses.

4. A microscope objective lens system according to claim 1 having the following numerical data:

| | | | |
|---|---|---|---|
| f | = 1.0, N.A = 0.25, | W.D = 0.4312, | β = 10X |
| $r_1$ | = 4.2548 | | |
| | $d_1$ = 0.0746 | $n_1$ = 1.69350 | $v_1$ = 53.23 |
| $r_2$ | = −0.4437 | | |
| | $d_2$ = 0.0144 | | |

-continued

| | | | |
|---|---|---|---|
| $r_3$ = 0.4894 | | | |
| | $d_3$ = 0.3450 | $n_2$ = 1.62041 | $\nu_2$ = 60.27 |
| $r_4$ = 0.3819 | | | |
| | $d_4$ = 0.0542 | | |
| $r_5$ = −0.2106 | | | |
| | $d_5$ = 0.3424 | $n_3$ = 1.80518 | $\nu_3$ = 25.43 |
| $r_6$ = ∞ | | | |
| | $d_6$ = 0.0075 | | |
| $r_7$ = −2.3395 | | | |
| | $d_7$ = 0.1313 | $n_4$ = 1.61800 | $\nu_4$ = 63.38 |
| $r_8$ = −0.5182 | | | |
| | $d_8$ = 0.0057 | | |
| $r_9$ = 4.2540 | | | |
| | $d_9$ = 0.1398 | $n_5$ = 1.65830 | $\nu_5$ = 57.33 |
| $r_{10}$ = −0.7759 | | | | wherein the reference f represents a focal length of the entire lens system, N.A. represents a numerical aperture, W.D. represents a working distance, $\beta$ represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $\nu_1$ through $\nu_5$ represent Abbe's numbers of the respective lenses.

5. A microscope objective lens system according to claim 1 having the following numerical data:

| | | | |
|---|---|---|---|
| f = 1.0, N.A = 0.25, | | W.D = 0.4282, | $\beta$ = 10X |
| $r_1$ = 4.4042 | | | |
| | $d_1$ = 0.0742 | $n_1$ = 1.72916 | $\nu_1$ = 54.68 |
| $r_2$ = −0.4510 | | | |
| | $d_2$ = 0.0200 | | |
| $r_3$ = 0.4462 | | | |
| | $d_3$ = 0.3138 | $n_2$ = 1.62041 | $\nu_2$ = 60.27 |
| $r_4$ = 0.3419 | | | |
| | $d_4$ = 0.0690 | | |
| $r_5$ = −0.2035 | | | |
| | $d_5$ = 0.3401 | $n_3$ = 1.80518 | $\nu_3$ = 25.43 |
| $r_6$ = ∞ | | | |
| | $d_6$ = 0.0074 | | |
| $r_7$ = −2.2995 | | | |
| | $d_7$ = 0.1314 | $n_4$ = 1.61800 | $\nu_4$ = 63.38 |
| $r_8$ = −0.5150 | | | |
| | $d_8$ = 0.0057 | | |
| $r_9$ = 4.6177 | | | |
| | $d_9$ = 0.1386 | $n_5$ = 1.65830 | $\nu_5$ = 57.33 |
| $r_{10}$ = −0.7498 | | | | wherein the reference f represents a focal length of the entire lens system, N.A. represents a numerical aperture, W.D. represents a working distance, $\beta$ represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $\nu_1$ through $\nu_5$ represent Abbe's numbers of the respective lenses.

6. A microscope objective lens system according to claim 1 having the following numerical data:

| | | | |
|---|---|---|---|
| f = 1.0, N.A = 0.25, | | W.D = 0.4277, | $\beta$ = 10X |
| $r_1$ = 4.2976 | | | |
| | $d_1$ = 0.0741 | $n_1$ = 1.69680 | $\nu_1$ = 55.52 |
| $r_2$ = −0.4373 | | | |
| | $d_2$ = 0.0199 | | |
| $r_3$ = 0.4327 | | | |
| | $d_3$ = 0.3135 | $n_2$ = 1.62041 | $\nu_2$ = 60.27 |
| $r_4$ = 0.3415 | | | |
| | $d_4$ = 0.0690 | | |
| $r_5$ = −0.2015 | | | |
| | $d_5$ = 0.3397 | $n_3$ = 1.80518 | $\nu_3$ = 25.43 |
| $r_6$ = ∞ | | | |
| | $d_6$ = 0.0074 | | |
| $r_7$ = −2.0378 | | | |
| | $d_7$ = 0.1313 | $n_4$ = 1.61800 | $\nu_4$ = 63.38 |
| $r_8$ = −0.5122 | | | |
| | $d_8$ = 0.0057 | | |
| $r_9$ = 4.2025 | | | |
| | $d_9$ = 0.1385 | $n_5$ = 1.65830 | $\nu_5$ = 57.33 |
| $r_{10}$ = −0.7450 | | | | wherein the reference f represents a focal length of the entire lens system, N.A. represents a numerical aperture, W.D. represents a working distance, $\beta$ represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $\nu_1$ through $\nu_5$ represent Abbe's numbers of the respective lenses.

7. A microscope objective lens system according to claim 1 having the following numerical data:

| | | | |
|---|---|---|---|
| f = 1.0, N.A = 0.25, | | W.D = 0.4275, | $\beta$ = 10X |
| $r_1$ = 1.7376 | | | |
| | $d_1$ = 0.0743 | $n_1$ = 1.72916 | $\nu_1$ = 54.68 |
| $r_2$ = −0.5075 | | | |
| | $d_2$ = 0.0194 | | |
| $r_3$ = 0.4857 | | | |
| | $d_3$ = 0.3143 | $n_2$ = 1.62041 | $\nu_2$ = 60.27 |
| $r_4$ = 0.3659 | | | |
| | $d_4$ = 0.0692 | | |
| $r_5$ = −0.2100 | | | |
| | $d_5$ = 0.3177 | $n_3$ = 1.80518 | $\nu_3$ = 25.43 |
| $r_6$ = ∞ | | | |
| | $d_6$ = 0.0080 | | |
| $r_7$ = −2.1046 | | | |
| | $d_7$ = 0.1686 | $n_4$ = 1.61800 | $\nu_4$ = 63.38 |
| $r_8$ = −0.5049 | | | |
| | $d_8$ = 0.0057 | | |
| $r_9$ = 2.8964 | | | |
| | $d_9$ = 0.1200 | $n_5$ = 1.64000 | $\nu_5$ = 60.09 |
| $r_{10}$ = −0.8754 | | | | wherein the reference f represents a focal length of the entire lens system, N.A. represents a numerical aperture, W.D. represents a working distance, $\beta$ represents a lateral magnification, $r_1$ through $r_{10}$ represent radii of curvature of the respective surfaces of the lenses, $d_1$ through $d_9$ represent thicknesses of the respective lenses and airspaces therebetween, $n_1$ through $n_5$ represent refractive indices of the respective lenses and $\nu_1$ through $\nu_5$ represent Abbe's numbers of the respective lenses.

* * * * *